Oct. 30, 1956  G. V. LINDGREN  2,768,484
GRINDING WHEEL CHUCK
Filed Jan. 7, 1955

INVENTOR.
GEORGE V. LINDGREN
BY
Dike, Thompson & Sanborn
ATTORNEYS

United States Patent Office 2,768,484
Patented Oct. 30, 1956

2,768,484

GRINDING WHEEL CHUCK

George V. Lindgren, Townsend, Mass.

Application January 7, 1955, Serial No. 480,500

3 Claims. (Cl. 51—209)

The present invention is a chuck for centerless grinding wheels which are normally supported on a grinding machine by being gripped about the periphery. Examples of this type of grinder are vertical surface grinders of the Blanchard type and the grinder illustrated in the patent to H. K. Spencer No. 1,182,861.

At present centerless grinding wheels are commonly secured on the grinding head of a grinding machine by a plurality of set screws or jaws moved by set screws which bear against the periphery of the grinding wheel at points spaced around the periphery.

With this arrangement it is difficult to mount the grinding wheel on center with the spindle of the grinding head since each set screw is adjusted separately. If the grinding wheel is off-center it chatters against the surface of the work piece and makes the surface uneven. This chattering also causes vibration in the spindle of the grinding head which rapidly burns out the bearings in the grinding machine.

When the chattering occurs the set screws must be readjusted and when a new grinding wheel is mounted it frequently requires several tests and adjustments before the wheel is sufficiently centered to eliminate chattering. Therefore, in the usual grinding operation in which a series of grinding wheels of increasingly finer grade are successively attached to the grinding head, quite a bit of time is wasted centering the successive grinding wheels.

It is an object of the present invention to provide a grinding wheel chuck which automatically centers the grinding wheel with the spindle as the jaws of the chuck tighten against the grinding wheel and thereby eliminate time consuming tests and readjustments.

Another object is to provide a grinding wheel chuck which centers the grinding wheel mechanically which is simpler and more accurate than by centering the grinding wheel by eye and by trial and error which is the method used in chucks commonly in use at present.

It is a further object to provide a chuck in which jaws spaced around the grinding wheel are tightened against it by turning a single key until it is hand tight and thereby to eliminate the time and skill required to turn several set screws the correct amount to position and hold the grinding wheel in centered position.

Further objects and advantages of the grinding wheel chuck of the present invention will be apparent from the following description and accompanying drawings in which.

Figure 2:
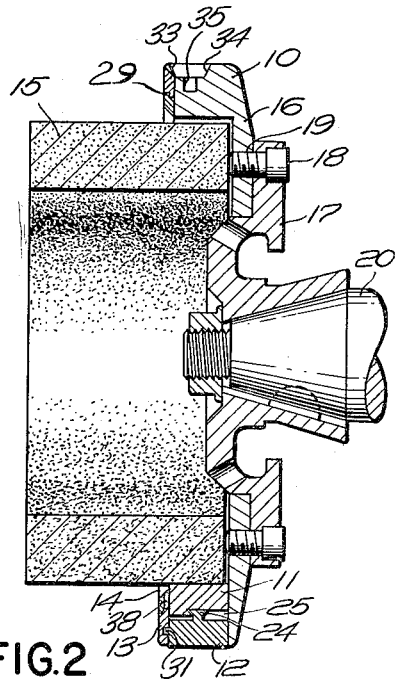
Fig. 2 is a section along the line 2—2 of Fig. 1 and showing the spindle of a grinding machine to which the chuck of Fig. 1 is attached and showing a grinding wheel in the chuck.

Referring now to the drawings and particularly Fig. 2, the grinding wheel chuck of the present invention comprises generally a hollow cylindrical body 10, jaws 11 movable radially through the body, sliding blocks 12 connected to the jaw elements, a rotatable ring 13 connected to move the jaws, and a retaining ring 14.

The hollow cylindrical body 10 is open at one end to receive a grinding wheel 15 and has an inwardly directed flange 16 at the other end. The body 10 is attached to a face plate 17 of a grinding machine by screws 18 through the face plate and threaded into holes 19 in the flange 16.

The face plate 17 is mounted on the end of a rotatable spindle 20 of a conventional type grinding machine, the remaining parts of which are not shown.

Figure 1:
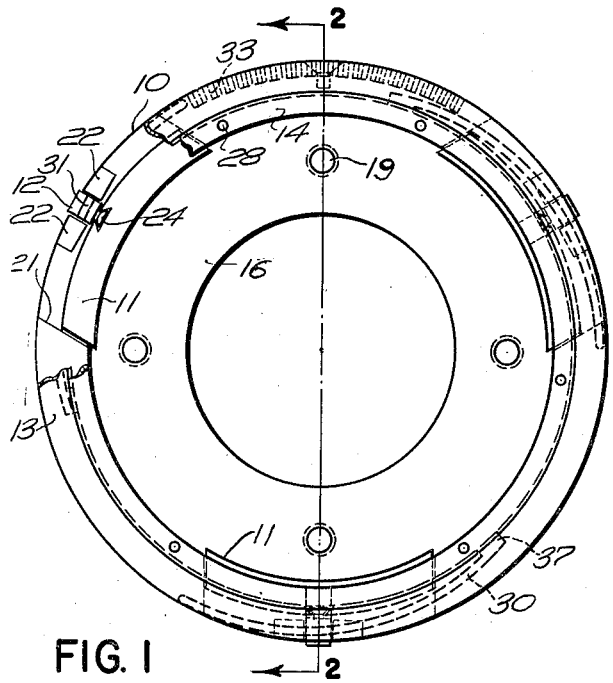
Fig. 1 is a front end elevation partly broken away of the grinding wheel chuck of the present invention.

Looking now at Fig. 1, the jaw elements 11 are slidable radially of the body 10 in grooves 21 which extend through the wall of the body from the periphery to the inside. As shown, the jaw elements 11 are located at points spaced around the circumference of the body in order to grip a grinding wheel 15 at points spaced about its periphery. The inside or gripping surfaces of the jaw elements 11 are concave to correspond approximately with the periphery of a grinding wheel.

In the outward portion of each of the grooves 21 is a pair of way blocks 22 spaced apart and receiving between them one of the sliding blocks 12 which is thereby supported to slide radially of the body 10. At the inward end of each of the sliding blocks is an enlarged headed stud 24, the head of which is engaged in an undercut groove 25 in the peripheral surface of the adjacent jaw element 11 which is thus connected to move with the sliding block. When the sliding blocks 12 and jaw elements 11 are moved out from under the retaining ring 14 and rotatable ring 13—to disassemble the chuck, as will subsequently be described—the sliding blocks and jaw elements may be moved relatively apart in the direction in which the studs 24 slide out of the grooves 25 (see Fig. 2).

As shown in Fig. 1, the jaw elements 11 move back and forth in the forward portion of the groove 21. The groove 21 extends out through the wall of the body to the outside. This leaves an opening in back of the jaw elements between the walls of the grooves 21 and the way block 22 through which grit from the grinding operation passes to the outside of the chuck away from the jaw elements so that it will not collect around the jaw elements and bind them.

The rotatable ring 13 rotates about the axis of the body and is against the front face of the body where it passes over the sliding blocks 12. The rotatable ring 13 is held in position on the body by a retaining ring 14 which is concentrically inside the rotatable ring. The retaining ring 14 is attached on the face of the body 10 by screws 28. The adjacent edges of the two rings are stepped to interfit as indicated at 29 (Fig. 2) with the periphery of the retaining ring projecting over the inner circumference of the rotating ring. In this way the rotatable ring 13 is held in place on the body and is free to move relatively around the retaining ring.

Figure 3:
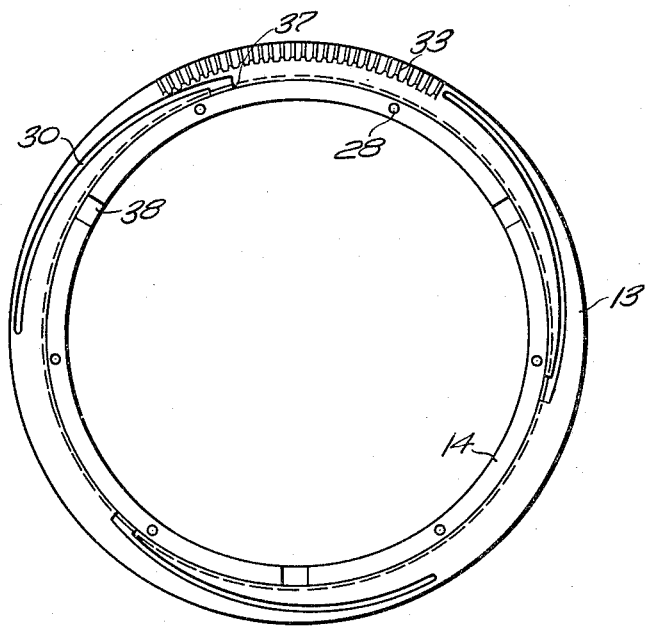
Fig. 3 is a rear view of the rotating ring and the locking ring of the chuck shown in Fig. 1, and showing them separated from the other parts of the chuck.

Referring now to Fig. 3, formed in the underside of the rotatable ring 13 which is toward the sliding blocks 12 is a spiral cam slot 30 for each sliding block. On each of the sliding blocks is a projection 31 which is received in the adjacent cam slot. When the rotatable ring 13 is rotated the cam slots 30 acting on the projections 31 move the sliding blocks and the attached jaws 11 radially into or out of the open center of the body depending upon the direction of rotation.

As shown in the drawings, the rotatable ring 13 may be adapted to be rotated about the axis of the body 10 by a Jacob type chuck key. For this purpose a portion of the underside of the peripheral edge of the rotatable ring 13 is beveled and provided with gear teeth 33. A portion of the adjacent edge of the body 10 is cut out as indicated at 34 to provide clearance for a Jacob type chuck key and a well 35 formed in the bottom of the cut out portion 34 is provided to receive and locate the nose or pivot of the Jacob key. When the pivot of the Jacob key is inserted in the well 35 the beveled gear portion of the key engages the gear teeth 33 of the rotatable ring 13 which is then rotated by turning the key.

As most clearly indicated in Fig. 3 the inward ends of the spiral cam slots 30 terminate in slots 37 which extend to the inner circumference of the rotatable ring in radial line with the projections on the sliding blocks 12. On the underside of the retaining ring 14 are other slots 38. The slots 37 and 38 are sufficiently wide and deep to provide clearance for the projections 31. Thus when the rotatable ring is moved to align the slots 37 with the slots 38 the sliding blocks 12 and attached jaw elements 11 can be slid out from under the rotatable ring and retaining ring into the open central portion of the body 10 where they may be separated by lifting the jaw elements 11 to disengage the under cut grooves 25 from the studs 24.

The jaw elements 11 and sliding blocks 12 which operate as a unit are made separate so that they may be made of different material. For example the sliding blocks 12 may be made of steel in order that their projections 31 which slide in the cam slots 30 will resist wear, while the jaw elements 11 may be made of beryllium copper which provides a good surface for gripping the grinding wheel.

To operate the chuck of the present invention a Jacob type chuck key is engaged with the gear teeth 33 and the rotatable ring 13 moved in a counterclockwise direction (Fig. 1) to withdraw the jaws out of the central portion of the body to make room for the insertion of a grinding wheel 15. Then when a grinding wheel is placed in the center of the body the key is turned to move the rotatable ring in the opposite (clockwise) direction until the cam slots 30 acting through the projections 31 of the sliding block move the sliding blocks and attached jaws 11 to grip the periphery of the grinding wheel.

Looking at Fig. 1, when the grinding head of the machine is rotated in a counterclockwise direction the drag of the grinding wheel on a work piece in combination with the centrifugal force of the chuck tends to urge the rotatable ring 13 relatively in the clockwise direction in which the cam slots 30 increase the gripping pressure of the jaws 11. Thus grinding wheel 15 is held securely.

The holes 19 in the flange 16 of the body 10 are located to center the body relative to the spindle 19 when the body is attached to the face plate 17 by the screws 18. Similarly the screws 28 which attach the retaining ring 14 to the body 10 are located to center the retaining ring and the connected rotating ring 13 relative to the body 10. The spiral cam slots 30 are all located in the same relation to the center of the body and each of the jaws 11 and each of the sliding blocks 23 are as identical to the others as it is possible to make them. Thus when the chuck is assembled the gripping surfaces of the jaws are equidistant from the center of the body 10 and spindle 20. Then they move inward simultaneously and each the same amount so that a grinding wheel 15 in the body 10 is worked into and gripped in a position in which it is on center with the spindle 20.

The above description is of a preferred embodiment of the grinding wheel chuck of the present invention and it will be appreciated that certain variations may be made in the described structure without departing from the spirit of the invention.

What I claim as my invention is as follows:

1. A grinding wheel chuck comprising in combination a circular body having a hollow cylindrical portion open at the front to receive one end of a cylindrical grinding wheel, said body having a plurality of radial grooves at spaced intervals in a front face thereof, said grooves slidably containing radially movable wheel gripping jaws, a continuous circular cam ring mounted rotatably and concentrically relative to the body against its said front face, said cam ring having a plurality of spiral cam grooves each corresponding to a said jaw, cam follower means operatively connecting each said jaw to a said cam groove, a continuous retaining ring secured to said body against its said front face and overlapping said cam ring, thereby retaining said jaws and said cam ring in operative position, and means to rotate said cam ring relative to said body to open and close said jaws.

2. In the combination as set forth in claim 1, said cam follower means including a pair of guide blocks in the back of each said radial groove adjacent the periphery of the body, a radially slidable block between each said pair of guide blocks, each said radially slidable block having a projection engaging a respective said cam groove, an undercut groove on the outside of each said slidable jaw and a stud on each said radially slidable block engaging a said undercut groove to couple together each said slidable block and a corresponding slidable jaw.

3. In the combination as set forth in claim 1, said means to rotate said cam ring relative to said body comprising gear teeth on the side of said cam ring toward said body and a recess in said body adjacent said gear teeth arranged to receive a Jacob wrench for engagement with said gear teeth.

References Cited in the file of this patent

UNITED STATES PATENTS

| | | |
|---|---|---|
| 505,178 | Shaw | Sept. 19, 1893 |
| 601,513 | Hartness | Mar. 29, 1898 |
| 1,767,821 | Thompson | June 24, 1930 |
| 1,838,714 | Stevens | Dec. 29, 1931 |
| 1,981,660 | Olson | Nov. 20, 1934 |
| 2,450,230 | Bush | Sept. 28, 1948 |

FOREIGN PATENTS

| | | |
|---|---|---|
| 15,504 | Great Britain | June 6, 1912 |